United States Patent [19]

Hayashi et al.

[11] 4,111,748

[45] Sep. 5, 1978

[54] NUCLEAR FUEL ROD WITH STRESS RELIEVING DEVICE

[75] Inventors: Kiyozumi Hayashi, Chiba; Kenji Sato, Zushi, both of Japan

[73] Assignee: Doryokuro Kakunenryo Kaihatsu Jigyodan, Tokyo, Japan

[21] Appl. No.: 689,987

[22] Filed: May 26, 1976

[30] Foreign Application Priority Data

Jun. 18, 1975 [JP] Japan ................................. 50-74145
Jun. 18, 1975 [JP] Japan ............................. 50-83360[U]

[51] Int. Cl.² ............................................... G21C 3/02
[52] U.S. Cl. ......................................... 176/68; 176/79
[58] Field of Search ................................... 176/68, 79

[56] References Cited

U.S. PATENT DOCUMENTS

| | | | |
|---|---|---|---|
| 3,291,698 | 12/1966 | Fortescue | 176/68 |
| 3,459,636 | 8/1959 | Gernier | 176/68 |
| 3,644,174 | 2/1972 | Ferrari | 176/79 X |
| 3,647,622 | 3/1972 | Andrews et al. | 176/68 |
| 3,647,623 | 3/1972 | Hepps et al. | 176/68 |
| 3,671,393 | 6/1972 | Williams | 176/68 X |
| 3,759,243 | 9/1973 | Masetti | 176/68 |
| 3,989,590 | 11/1976 | Wehrli et al. | 176/68 |

FOREIGN PATENT DOCUMENTS

2,356,182 9/1973 Fed. Rep. of Germany ............ 176/68

*Primary Examiner*—Peter A. Nelson

[57] ABSTRACT

A nuclear fuel rod is made up of a stack of pellets of fuel material and a cladding or sheathing tube is provided. A metallic supporting structure is interposed between the pellet stack and an end plug of said cladding tube. The supporting structure can maintain the original shape under the normal operating reactor conditions, but when an excess stress is applied to the supporting structure, a mechanical break is produced in the supporting structure to reduce its supporting length, otherwise the excess stress would be exerted on said cladding tube in the vicinity of the end plug joints and might cause failure of the fuel rod.

10 Claims, 18 Drawing Figures

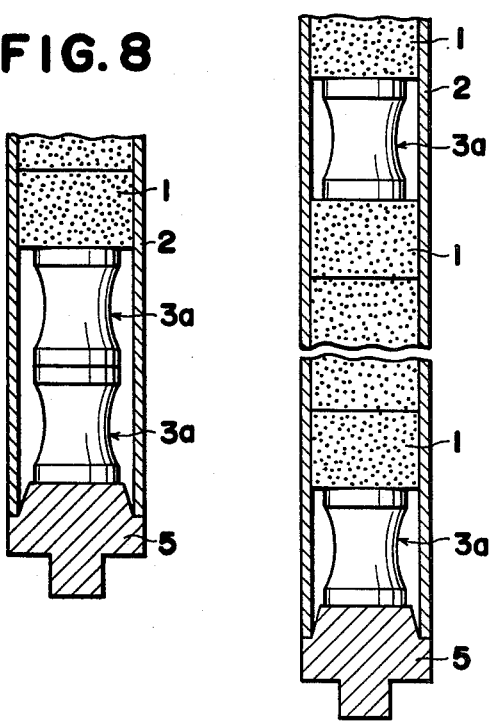
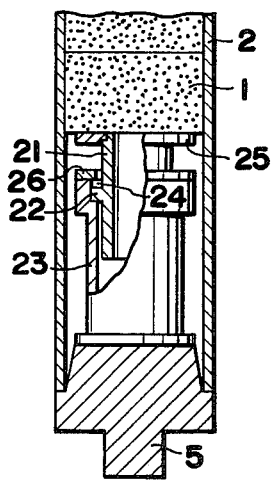
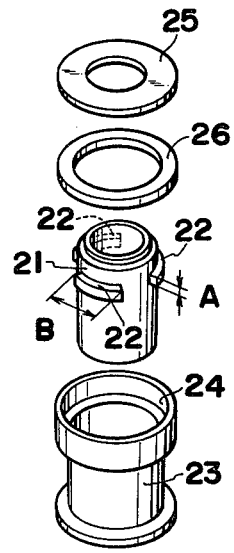
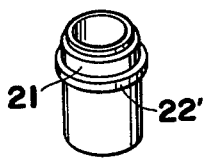
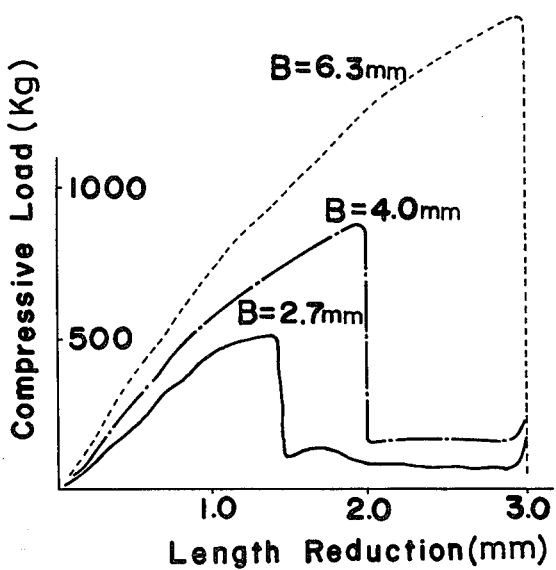

NUCLEAR FUEL ROD WITH STRESS RELIEVING DEVICE

BACKGROUND OF THE INVENTION

This invention relates to a nuclear fuel rod for use in a nuclear reactor, and more particularly to a novel supporting structure used in such nuclear fuel rod to accomodate the stack length of fuel of pellets in a cladding or sheathing tube.

In fabricating the nuclear fuel rod of the type used heretofore, nuclear fuel pellets are charged into a cladding or sheathing tube (usually 7 to 17mm in outer diameter, 0.4 to 1.2mm in thickness and about 4m in full length) and then end plugs are welded to both ends of said cladding tube for hermetically sealing, with a coil spring being interposed between the upper end plug and the pellet stack. The upper space occupied by such coil spring, which is a plenum, proves effective in absorbing thermal expansion of the pellet stack or internal pressure built up in the cladding tube by the gas generated during nuclear fission, while the coil spring per se provides a pressing force against the pellet stack to prevent shaking or other un-favourable movement of the pellets during handling of the fuel rod before it is charged into the nuclear reactor.

It is a general practice that the clearance between the cladding tube and the pellets is less than about 0.3mm at the time of fabricating the fuel rod. However, such clearance tends to be reduced under the irradiation for several reasons such as that the pellet temperature becomes far higher than that of the cladding tube, and that the pellets have a greater degree of thermal expansion than the cladding tube. Further, cracks or flaws could develop in the pellets at the initial stage of reactor operation and the pellets might be strongly adhered at least partially with the cladding tube. Therefore, pellets are not always freely movable longitudinally in the cladding tube. In such cases it is hardly possible for the upper end space alone to sufficiently absorb the axial movement of the pellet stack caused by thermal expansion of the pellets.

The heat generation in the nuclear rod is higher in its middle portion than in the other portions, so that it can be expected that the strong mechanical interaction may occur between the pellets and the middle portion of the cladding tube. During such occasions as restarting of the reactor, over-power operation or rapid increase of reactor output, it could be difficult to sufficiently absorb thermal expansion of the pellet stack located in the lower-half portion adjacent to the lower end plug, with the result that excess stress is given to the cladding tube or the lower end plug joint which could cause a rupture of the fuel rod. In order to solve such problem, it has been attempted to provide a coil spring and a space not only at the top of the pellet stack but also at the bottom thereof, i.e. between the bottom end of the pellet stack and the lower end plug, to thereby absorb downward elongation of the pellet stack. However, such support using a coil spring has a disadvantage that spring property could be changed or relaxed during use of the reactor, making it impossible to maintain the original bottom position of the pellet stack. If the bottom of the pellet stack is lowered, voids are formed between the pellets in the stack which cause local elevation of the fuel rod output (forming so-called hot spots) which lead to an undesirable performance of the safety of the nuclear fuel.

SUMMARY OF THE INVENTION

An object of the present invention, therefore, is to provide a novel nuclear fuel rod provided with a pellet stack supporting structure which can keep the fuel rod substantially sound and safe through the full life of the fuel in the reactor, and which is also capable of releasing a part or all of any axial excess stress in a cladding or sheathing tube, if such stress is given to the fuel rod during reactor use.

Another object of the present invention is to provide a pellet stack supporting structure which does not reduce or impair the effective volume of the gaseous space which is usually provided at the lower end of the pellet stack.

Still another object of the present invention is to provide a pellet stack supporting structure the length of which is variable step by step in accordance with levels of the axial excess stresses.

A further object of the present invention is to provide a supporting structure of the type whereby it is possible to maintain a uniform bottom plane of the fuel of an active reactor core in normal reactor operating conditions.

In order to accomplish the above-described objects, the present invention proposes interposition of a metallic supporting structure between at least one of the end plugs at the end of the cladding tube of a nuclear fuel rod and a stack of pellets of nuclear fuel material encapsulated in said cladding tube. The break strength at the plugged end portion of the fuel rod, although varying depending on the material, size, temperature to which it is opposed and other use conditions, is usually between about 200 and 1800kg. Therefore, the metallic supporting structure according to the present invention can be easily designed to maintain its original shape under the normal designed reactor operating conditions.

When the pellet stack supporting structure receives a load exceeding a predetermined level less than half the limit of the axial rupture strength at the plugged end portion of the fuel rod, a mechanical break or collapse or crush occurs in the supporting structure to reduce its length and to release a part or the whole of the excess stress, thereby keeping the cladding tube or the plugged end junctures free from any undue stress. The nuclear reactor is periodically shut down for detailed inspections of reactor components, and the examination of the irradiated fuels is done at the fuel storage area. This is the chance to examine whether any mechanicl break is present in the supporting structure before re-use of the fuel in the reactor. Such examination can be done non-destructively by, for example, X-ray inspection of the specific supporting structure contained in the cladding tube of the fuel rod.

Such supporting structure can be made simply by machining an annular recessed or thinned section in a cylindrical hollow body or collar and it is possible to specify the degree of mechanical break strength such as buckling or shear strength with relatively high accuracy by controlling the details of the shape of the collar. If a few slots are formed in the collar portion of the cylindrical body, it is possible to increase the amount of decrease of length of the supporting structure due to the excess compresive load. By forming a plurality of thin sections with different thicknesses in one supporting structure or by using a stack of supporting structures having the respective thin sections with different thicknesses, it is possible to produce a series of successive breaks to thereby allow retention of relatively uniform distribution of stress in the cladding tube or at the plugged end junctures.

For better understanding of the characteristic features of the present invention, it will now be described in further detail by way of some preferred embodiments thereof illustrated in the accompanying drawings.

DESCRIPTION OF THE DRAWINGS

FIGS. 8 and 9 are sectional views of the main parts of fuel rods showing the modes of incorporation of the supporting structures different from that of FIG. 1.

FIG. 10 is a sectional view of the principal parts of a fuel rod showing a mode of incorporation of another example of supporting structure designed to undergo shear.

FIG. 11 is an exploded perspective view of the supporting structure shown in FIG. 10.

FIG. 12 is a shear characteristic curve of the supporting structure shown in FIG. 10.

FIG. 13 is a perspective view of a modified component of the supporting structure shown in FIG. 11.

DETAILED DESCRIPTION OF THE PREFERRED EMBODIMENT

Figure 1:
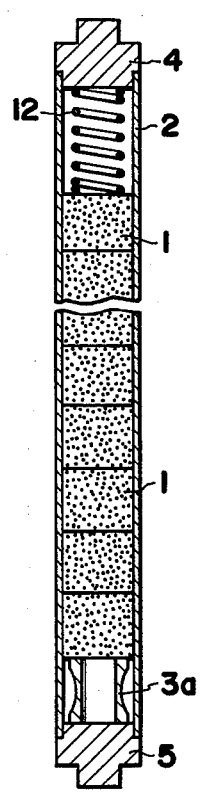
FIG. 1 is a sectional view of a nuclear fuel rod in accordance with the present invention, with the central portion of the rod being omitted.

Referring to FIG. 1, there is shown a nuclear fuel rod comprising a plurality of stacked pellets of nuclear fuel material 1, a cladding tube 2 encasing said stack of pellets of fuel material therein, a metallic supporting structure 3a provided at the bottom end of the pellet stack, an upper plenum coil spring 12 provided at the top end of the pellet stack, and a pair of end plugs 4 and 5 at both ends of the cladding tube 2 for hermetically sealing the ends of the tube. As is apparent from FIG. 2, the supporting structure 3a on the lower end plug 5 is formed by cutting a groove around the central peripheral portion of a cylindrical body 6a the cross-section of the groove having a curvature R so as to form a curved constriction or thin portion 7 centrally of the supporting structure 3a so that the desired buckling characteristic is attained when a certain predetermined load is applied. It is of course possible to set the buckling load as desired by suitably changing the smallest thickness $t$ of the central thinned portion. In an embodiment of the invention, cylindrical bodies 6a having a 14mm$\phi$ outer diameter, 8mm$\phi$ inner diameter and 24mm height were made by using SUS 304 steel and the central peripheral portions of these cylindrical bodies were peripherally grooved with the cross-section of the grooves having radii of cut with curvatures R of 16.35mm and 17.45mm respectively (the smallest thickness $t$ at the center being 0.3mm and 0.5mm respectively) to obtain two different supporting structures 3a. Measurements on these supporting structures showed that the buckling load was 400kg and 900kg, respectively, as shown in the buckling characteristic curve of FIG. 3.

Figure 2A:
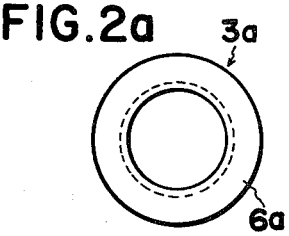
FIGS. 2a and 2b are side and partial sectional views of a supporting structure used on the lower end plug in the fuel rod shown in FIG. 1.
Figure 2B:
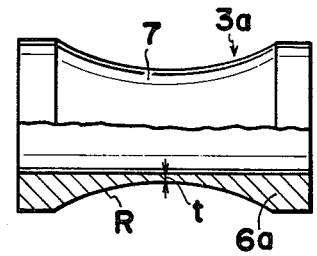
Figure 3:
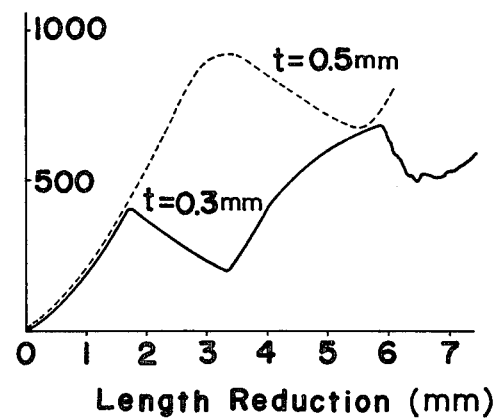
FIG. 3 is a buckling characteristic curve of the supporting structure shown in FIG. 2.
Figure 4A:
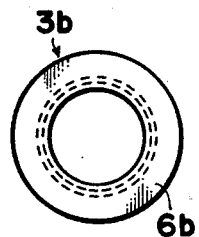
FIGS. 4a to 7b are respective side and partial sectional views of modified forms of the supporting structure which are crushable similar to the supporting structure shown in FIG. 2.
Figure 4B:
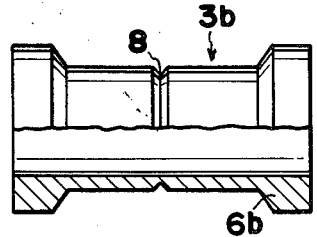
Figure 5A:
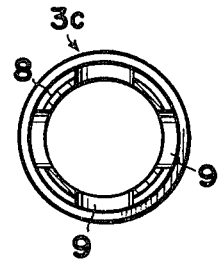
Figure 5B:
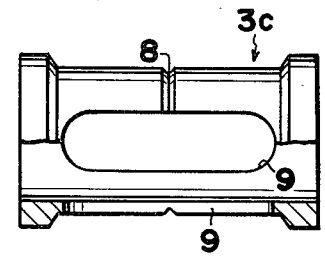
Figure 6A:
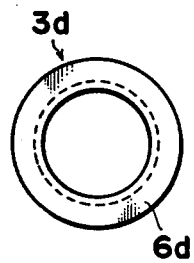
Figure 6B:
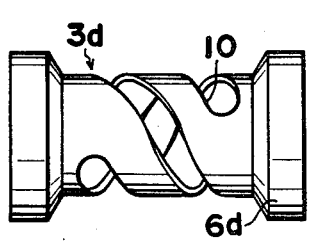
Figure 7A:
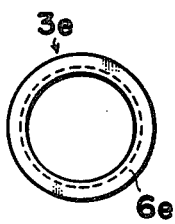
Figure 7B:
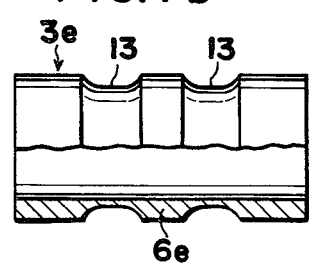

A supporting structure 3b, which is provided with a circumferential V-shaped notch 8 at the center of the cylindrical body 6b as shown in FIGS. 4a and 4b instead of providing the curved cut 7 such as shown in FIG. 2, is easy to produce to obtain a desired reduction in the supporting length at the time of buckling. A modified supporting structure 3c is provided, as shown in FIGS. 5a and 5b with four slots 9 extending parallel to the cylindrical axis in the cylindrical body of the supporting structure 3b of FIGS. 4a and 4b. In another modification shown in FIGS. 6a and 6b, a few slots 10 extend spirally in the cylindrical body 6d to form a supporting structure 3d. These modifications of FIGS. 5a, 5b, 6a and 6b allow a greater reduction in the length of the supporting structures 3c and 3d, in case of non-uniform reactor operating conditions. In still another modification shown in FIGS. 7a and 7b, two grooves 13 are provided in the cylindrical body 6e to form a supporting structure 3e. FIG. 8 shows a mode of application where two supporting structures of 3a are used in combination. In ether of these cases shown in FIGS. 7a and 7b and 8, buckling of the supporting structure or structures may be caused in proper sequence to allow corresponding successive reduction of the length of the supporting structure by suitably changing the thickness of the respective constricted portions. If necessary, another supporting structure 3a may be interposed between pellets 1 as shown in FIG. 9.

The similar action and effect can be attained by inducing a shearing phenomenon as in the embodiment shown in FIG. 10 instead of the buckling phenomenon. In this embodiment, a supporting structure consists of an inner cylinder 21 provided with three circumferential flanges 22 and an outer cylinder 23 designed to fit around the inner cylinder 21. The outer cylinder 23 is provided with an enlarged portion 24 which receives and holds the flanges 22 of the inner cylinder 21, as apparent from FIG. 11. It is possible to provide any desired shearing strength by suitably changing the axial thickness A and circumferential length B of each of the flanges 22. For the case of the supporting structures made by using SUS 304 steel and formed with flanges 22 with a thickness of 1mm and lengths of 6.3mm, 4.0mm and 2.7mm, the shearing load was 1560kg, 880kg and 505kg, respectively, as shown in the curve of FIG. 12.

In the embodiment shown in FIGS. 10 and 11, an inner cylinder stop 25 and an outer cylinder stop 26 are joined by spot welding to the inner cylinder 21 and outer cylinder 23, respectively. Thus, the amount of strain that can be absorbed at the time of shearing of the flanged portion 22 is regulated by the distance between the opposing faces of the two stops 25 and 26. Also, the both inner and outer cylinders 21 and 23 can be integrated by welding the outer cylinder stop 26 with the cylinder 23 to facilitate handling of the supporting structure when it is incorporated in the fuel rod. As shown in FIG. 13, an annular circumferential flange 22' may be provided around the inner cylinder 21, in place of the three flanges 22 in FIG. 11.

It will be understood that various changes in the details, materials and arrangements of the structural parts, which are herein described and illustrated in order to explain the nature of the invention, may be made by those skilled in the art within the principles and scope of the invention as expressed in the appended claims.

What is claimed is:

1. A nuclear fuel rod for use in a nuclear reactor comprising:
   a cladding tube,
   a stack of pellets of nuclear fuel material encased in said cladding tube,
   end plugs secured in both ends of said cladding tube,
   at least one metallic supporting structure interposed between at least one of said end plugs and said pellet stack, said supporting structure having a configuration for retaining its original shape while withstanding an axial elongation of said pellet stack caused by thermal expansion under normal reactor conditions, and having substantially rigid end portions and at least one weakened portion around the entire circumference thereof and intermediate the end portions for collapsing in the direction of the axis of said cladding tube when an abnormal stress due to thermal expansion under abnormal reactor conditions is applied to said supporting structure to reduce its original supporting length, thereby dispersing a part or whole of any excess stress which might develop in said cladding tube or at the end plug joints.

2. A nuclear fuel rod according to claim 1, wherein said metallic support structure is a hollow cylindrical body and said weakened portion is at least one thin portion extending circumferentially of the peripheral surface of said supporting structure, whereby said collapsing is caused by a mechanical break when the thin portion buckles.

3. A nuclear fuel rod according to claim 2, wherein said weakened portion has at least one groove therein with a cross-section having a predetermined radius of curvature.

4. A nuclear fuel rod according to claim 2, wherein said weakened portion has a circumferentially extending notch therein.

5. A nuclear fuel rod according to claim 2, wherein said weakened portion of said cylindrical body has a plurality of thin portions with different thicknesses, thereby allowing generation of a series of successive collapses to cause stepwise reduction of the supporting length with an increasing level of excess stress.

6. A nuclear fuel rod according to claim 1, wherein said metallic supporting structure is a hollow cylindrical body and said weakened portion has slots therein, the collapsing being caused by buckling of the portions of the cylindrical body between the slots.

7. A nuclear fuel rod according to claim 6, wherein said slots extend parallel to the cylindrical axis of said cylindrical body.

8. A nuclear fuel rod according to claim 7, wherein said slots extend spirally of the cylindrical body.

9. A nuclear fuel rod for use in a nuclear reactor, comprising:
   a cladding tube,
   a stack of pellets of nuclear fuel material encased in said cladding tube,
   end plugs secured in both ends of said cladding tube,
   at least one metallic supporting structure interposed between at least one of said end plugs and said pellet stack, said supporting structure consisting of a hollow inner cylinder and a hollow outer cylinder within which said inner cylinder is telescopically fitted, a plurality of flanges on one of the cylinders and the end of the other cylinder abutting said flanges for normally holding the cylinders in the non-telescoped positions, said flanges having a strength for withstanding axial elongation of the pellet stack caused by thermal expansion under normal reactor conditions, and the flanges shearing against the end of the abutting cylinder and the cylinders telescoping in the direction of the axis of the cladding tube when an abnormal stress due to thermal expansion under abnormal reactor conditions is applied to the cylinders to telescope them, thereby dispersing a part or whole of any excess stress which might develop in said cladding tube or the end plug joints.

10. A nuclear fuel rod for use in the nuclear reactor, comprising:
    a cladding tube,
    a stack of pellets of nuclear fuel material encased in said cladding tube,
    end plugs secured in both ends of said cladding tube,
    at least one metallic supporting structure interposed between at least one of said end plugs and said pellet stack, said supporting structure consisting of a hollow inner cylinder and a hollow outer cylinder within which said inner cylinder is telescopically fitted, an annular flange on one of the cylinders and the end of the other cylinder abutting said flange for normally holding the cylinders in the non-telescoped positions, said flanges having a strength for withstanding axial elongation of the pellet stack caused by thermal expansion under normal reactor conditions, and the flanges shearing against the end of the abutting cylinder and the cylinders telescoping in the direction of the axis of the cladding tube when an abnormal stress due to thermal expansion under abnormal reactor conditions is applied to the cylinders to telescope them, thereby dispersing a part or whole of any excess stress which might develop in said cladding tube or the end plug joints.

* * * * *